United States Patent [19]
Koyama et al.

[11] Patent Number: 6,003,575
[45] Date of Patent: Dec. 21, 1999

[54] PNEUMATIC TIRE INCLUDING SIPES

[75] Inventors: Toshio Koyama, Kobe; Masaru Araki, Nishinomiya; Mitsuharu Koya, Akashi, all of Japan

[73] Assignee: Sumitomo Rubber Industries, Ltd., Hyogo-ken, Japan

[21] Appl. No.: 08/905,949

[22] Filed: Aug. 5, 1997

[30]     Foreign Application Priority Data

| Aug. 5, 1996 | [JP] | Japan | 8-206101 |
| Jun. 11, 1997 | [JP] | Japan | 9-153821 |
| Jul. 8, 1997 | [JP] | Japan | 9-182666 |

[51] Int. Cl.$^6$ .......................... B60C 11/11; B60C 11/12; B60C 101/02; B60C 107/00
[52] U.S. Cl. .......................... 152/209.18; 152/209.22; 152/209.26; 152/209.27; 152/902; 152/DIG. 3
[58] Field of Search .......................... 152/209 R, 209 D, 152/DIG. 3, 209.18, 209.22, 209.26, 209.27, 902

[56]         References Cited

U.S. PATENT DOCUMENTS

| 2,690,202 | 9/1954 | Walsh | 152/209 R |
| 3,199,567 | 8/1965 | Kunz et al. | 152/209 R |
| 4,031,938 | 6/1977 | Verdier | 152/209 R |
| 4,705,088 | 11/1987 | Ghilardi | 152/209 R |
| 5,095,963 | 3/1992 | Maitre | 152/209 R |
| 5,109,904 | 5/1992 | Numata et al. | 152/DIG. 3 |
| 5,176,765 | 1/1993 | Yamaguchi et al. | 152/DIG. 3 |
| 5,301,727 | 4/1994 | Inoue | 152/DIG. 3 |
| 5,353,854 | 10/1994 | Landers et al. | 152/DIG. 3 |
| 5,361,815 | 11/1994 | Loser et al. | 152/209 R |

FOREIGN PATENT DOCUMENTS

| 0469816 | 2/1992 | European Pat. Off. . | |
| 469816 | 2/1992 | European Pat. Off. | 152/209 R |
| 0671288 | 9/1995 | European Pat. Off. . | |
| 19503406 | 8/1995 | Germany . | |
| 1-254406 | 10/1989 | Japan | 152/209 R |
| 3-182810 | 8/1991 | Japan | 152/209 R |
| 5-139120 | 6/1993 | Japan | 152/209 D |
| 5-169917 | 7/1993 | Japan | 152/209 D |
| 5-178030 | 7/1993 | Japan | 152/209 D |
| 6-143943 | 5/1994 | Japan | 152/209 R |
| 749929 | 6/1956 | United Kingdom | 152/209 R |
| WO 94/21478 | 9/1994 | WIPO | 152/209 R |

OTHER PUBLICATIONS

*Patent Abstracts of Japan*, vol. 015, No. 097 (M–1090), Mar. 8, 1991 & JP 02 310109 A.

*Primary Examiner*—Steven D. Maki

[57]            ABSTRACT

A pneumatic tire comprises an improved tread portion provided with blocks, each block provided with a sipe, the sipe extending across the block to have a first open end and a second open end, the sipe comprising three components forming a generally Z-shaped configuration, whereby the two parts divided by the sipe are engaged with each other to increase the block rigidity.

12 Claims, 14 Drawing Sheets

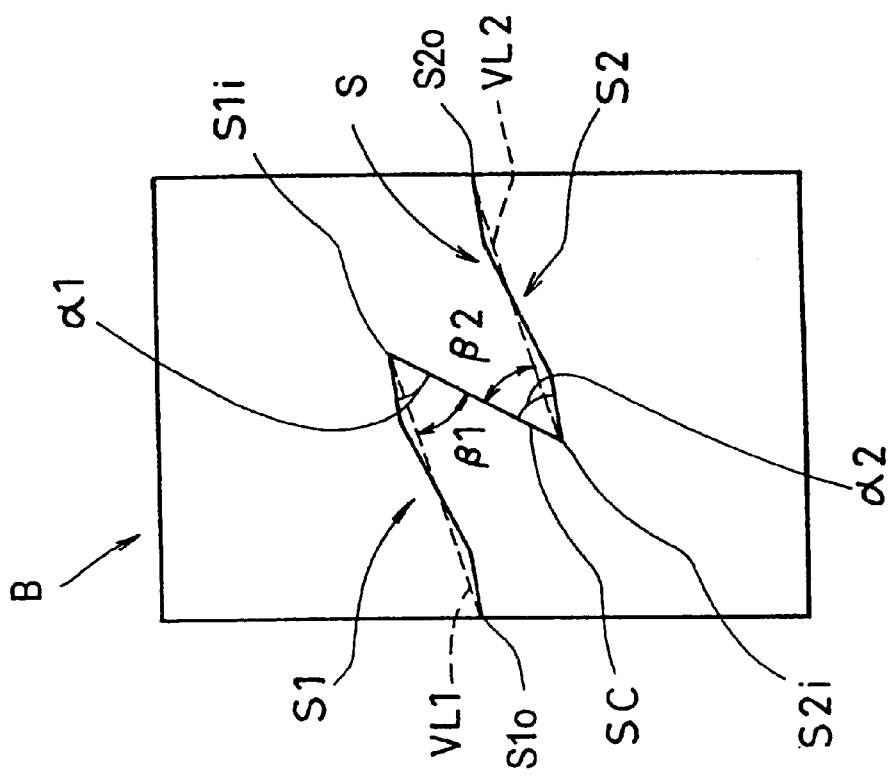
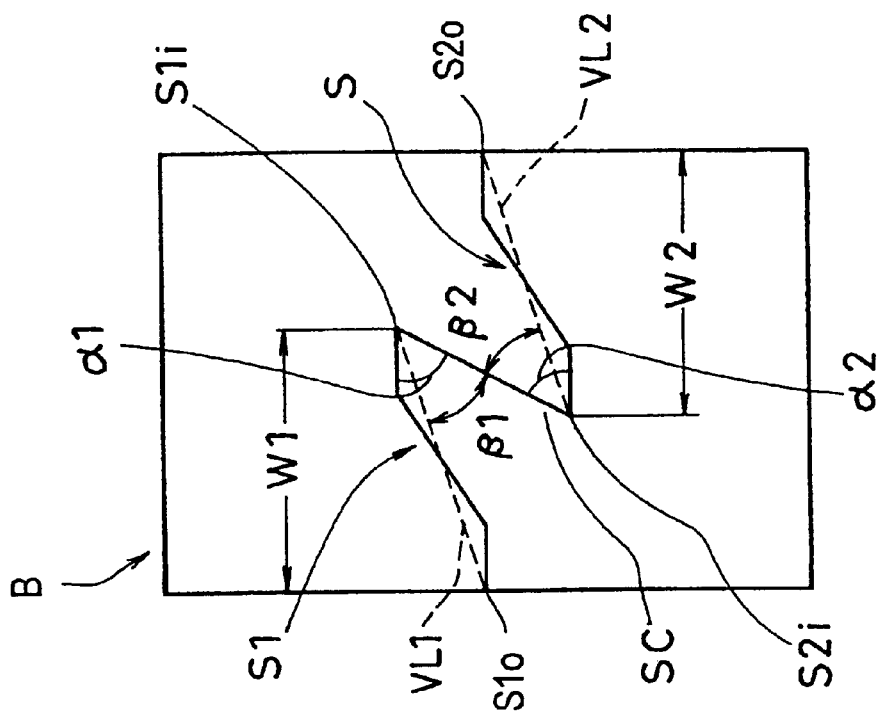
Fig. 5 (A)
Fig. 5 (B)

Fig. 8
Fig. 8 (A)     Fig. 8 (B)     Fig. 8 (C)
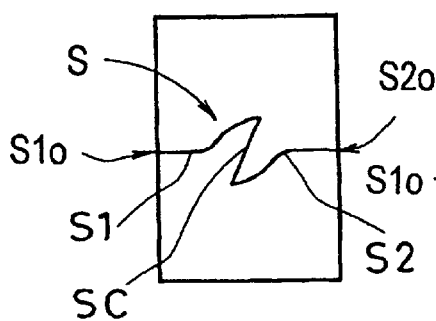 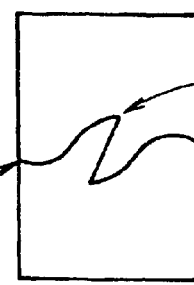 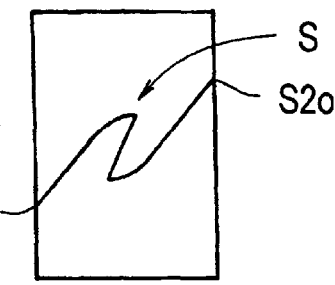
Fig. 8 (D)     Fig. 8 (E)
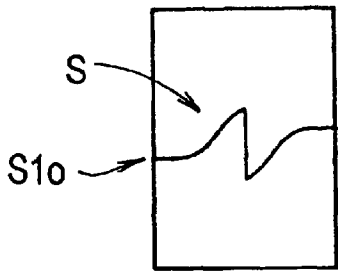 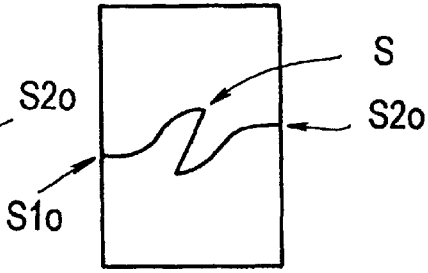

Fig. 18
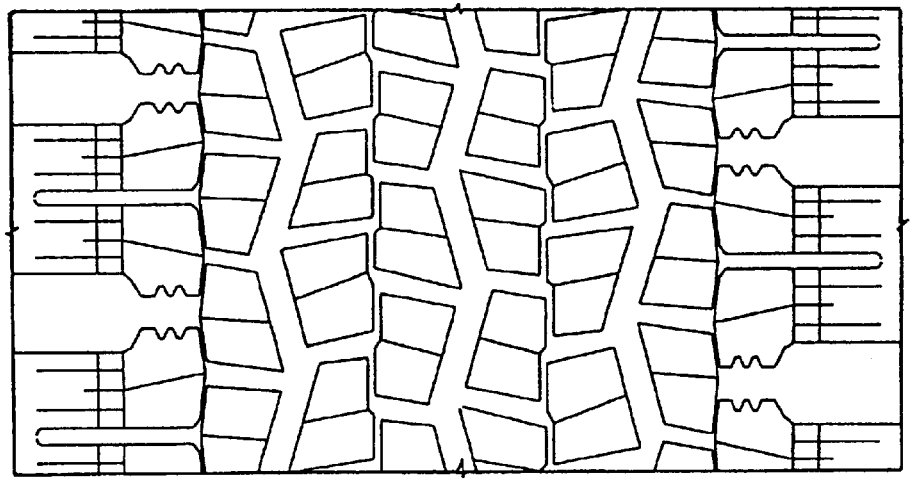
Fig. 19 (CONVENTIONAL ART)
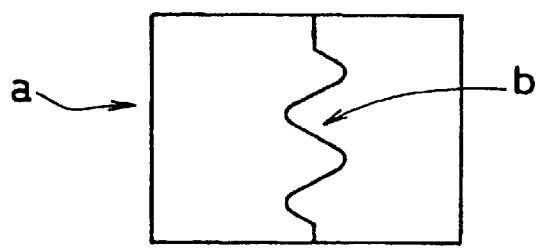
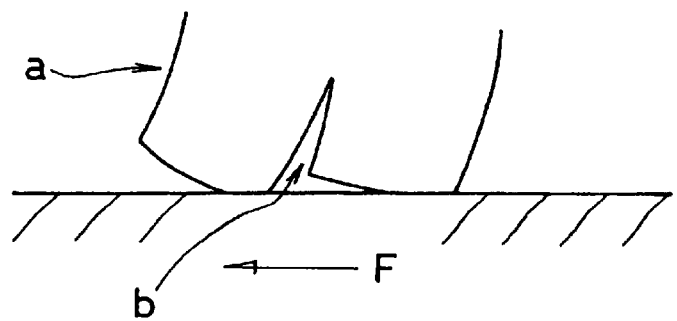

PNEUMATIC TIRE INCLUDING SIPES

BACKGROUND OF THE INVENTION

The present invention relates to a pneumatic tire more particularly an improved tread portion.

In recent years, the so called studless tires are widely used in various vehicles not only passenger cars but also heavy duty vehicles such as trucks and buses. In such studless tires, block type tread patterns are usually employed to improve road grip (snow grip, ice grip). In the heavy duty vehicles, however, due to the extremely heavy load in comparison with the passenger cars, the steering stability is liable to decrease because blocks are lower in the rigidity than a rib which is usually employed in summer tires. Notwithstanding, it is necessary for obtaining a necessary minimum road grip that the block tire is further provided with sipes to utilize the edges thereof. Such sipes are shown in FIGS. 7 and 19. The sipes divide the blocks into small parts, and the sipes open when the blocks are subjected to a circumferential force. Accordingly, the block rigidity decreases and the steering stability decreases. Further, uneven wear so called heel and toe wear occurs, and sometimes cracks and tear-off occur.

SUMMARY OF THE INVENTION

It is therefore, an object of the present invention to provide a pneumatic tire of a studless type, in which, by preventing the blocks from being decreased in the rigidity, the road grip is improved or maintained without decreasing the steering stability, uneven wear resistance, block durability and the like.

According to one aspect of the present invention, a pneumatic tire comprises a tread portion, the tread portion provided with grooves to form blocks, each block provided with a sipe, the sipe extending across the block to have a first open end and a second open end, the sipe comprising a first component extending from the first open end, a second component extending from the second open end and a central component extending therebetween so as to form a configuration such that the motion when the sipe is traced from the first open end to the second open end is first towards the second open end in the first component, then towards the first open end in the central component and again towards the second open end in the second part, whereby the configuration is generally a Z-shape.

In this application, Z-shape means both the normal image and mirror image of "Z" and "S".

Preferably, the length of the central component measured along the direction parallel to a straight line drawn from the first open end to the second open end is 0.1 to 0.6 times the length of the straight line, and the length of the central component measured along the direction normal to the straight line is 0.2 to 1.0 times the length of the straight line.

BRIEF DESCRIPTION OF THE DRAWINGS

Embodiments of the present invention will now be described in detail in conjunction with the accompanying drawings.

FIG. 5 shows other examples (A)–(B) of the sipe configuration.

FIG. 8 shows various examples (A)–(E) of the sipe configuration.

FIGS. 15–18 show tread patterns used in comparison tests.

FIG. 19 show a conventional zigzag sipe (b) and the problem opening of the block (a).

DETAILED DESCRIPTION OF THE INVENTION

In the figures, the pneumatic tires 1 according to the present invention are a heavy duty tire for used on trucks, buses and the like.

Figure 2:
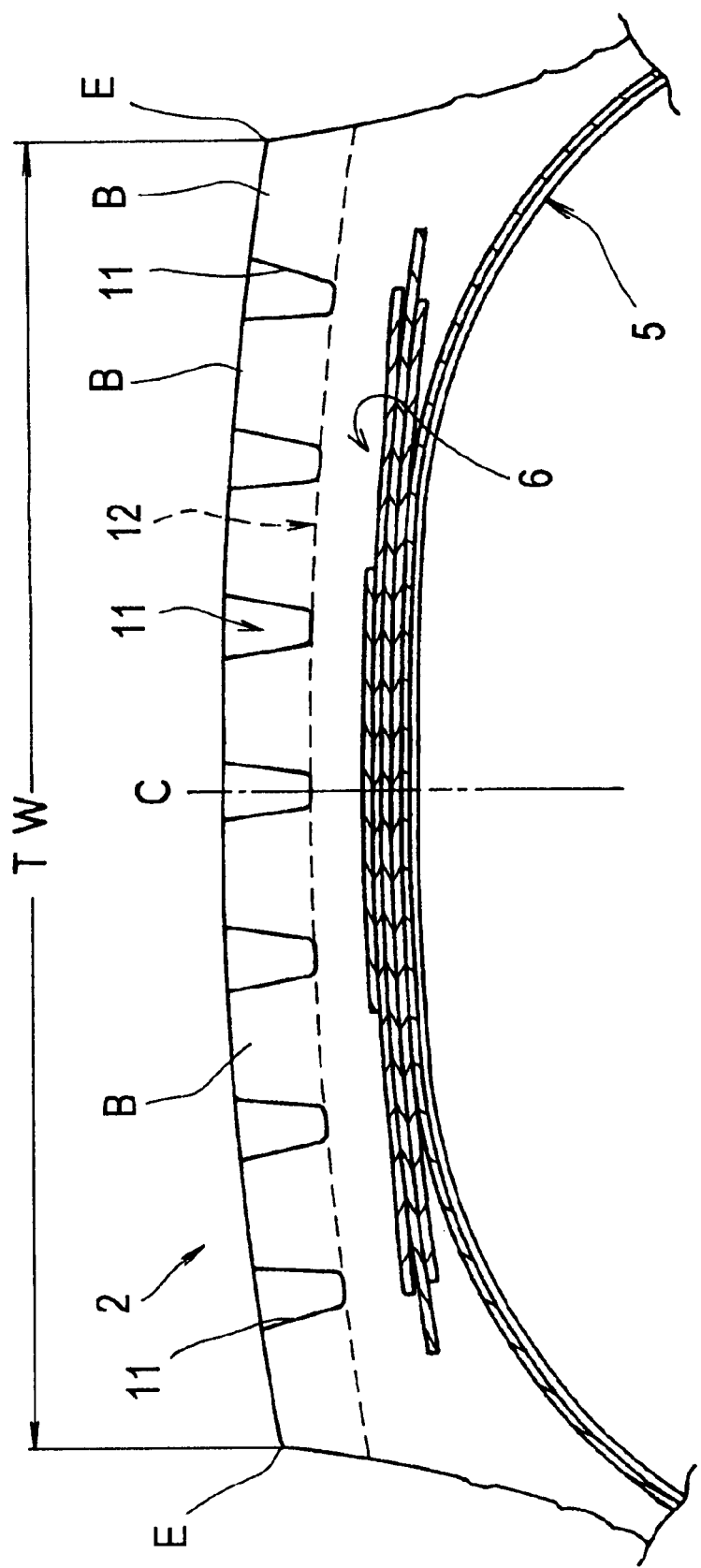
FIG. 2 is a cross sectional view of the tread portion thereof.
Figure 9:
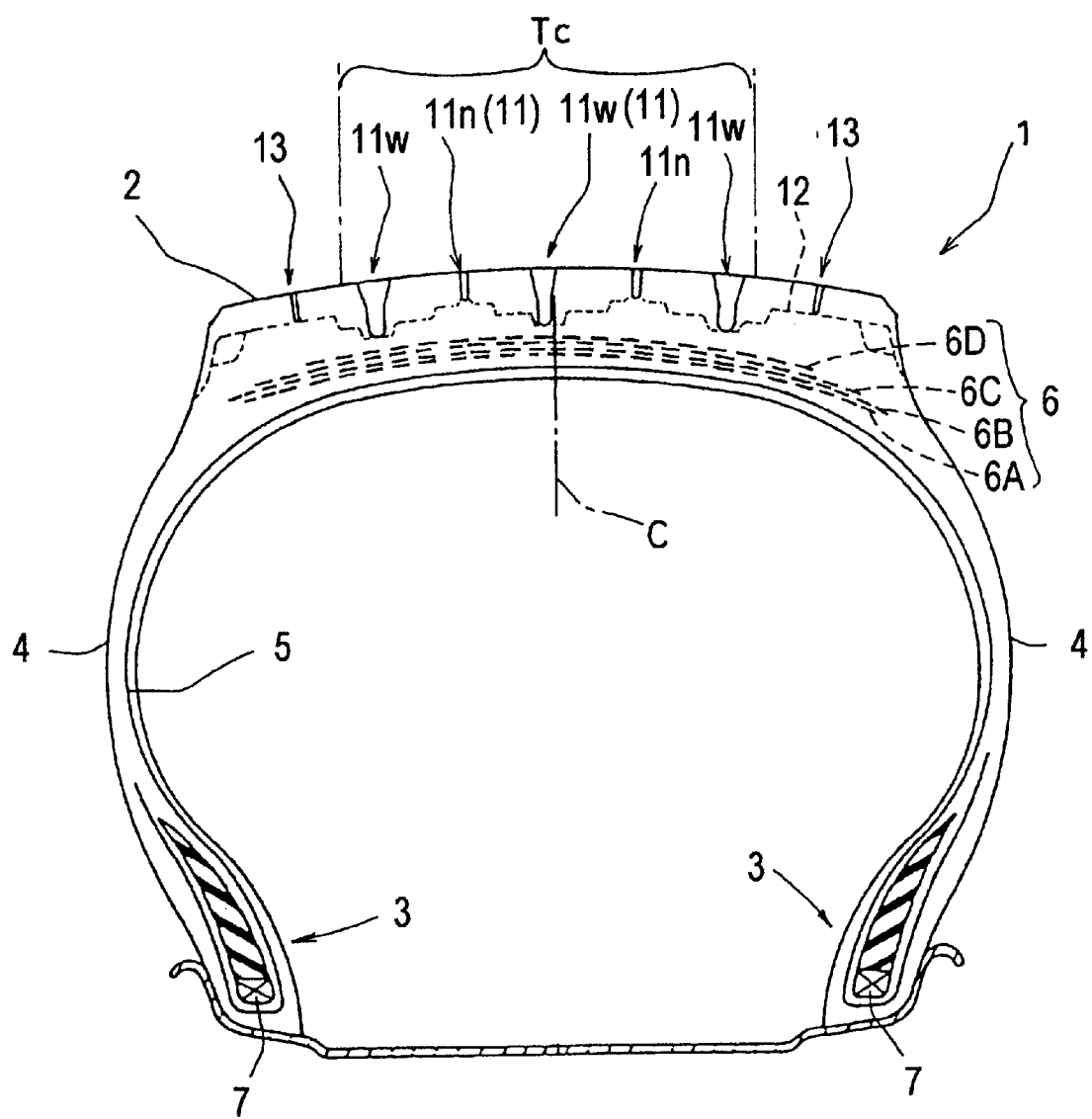
FIG. 9 is a cross sectional view of another embodiment of the present invention.

The tire 1 comprises, as shown in FIGS. 2 and 9, a tread portion 2, a pair of axially spaced bead portions 3 with a bead core 7 therein, a pair of sidewall portions 4 extending between the tread edges E and the bead portions 3, a carcass 5 extending between the bead portions 3, and a belt 6 disposed radially outside the carcass and inside the tread rubber.

The carcass 5 is composed of at least one ply of cords arranged radially at an angle of 90 to 70 degrees with respect to the tire equator C and extending between the bead portions 3 through the tread portion 2 and the sidewall portions 4 and turned up around the bead cores 7 in the bead portions 3 from the inside to the outside of the tire. For the carcass cords, steel cords and organic fiber cords, e.g. polyester, rayon, nylon, aromatic polyamide and the like can be used.

The carcass 5 in the embodiments is composed of a single ply of steel cords arranged at substantially 90 degrees.

The belt 6 is composed of at least two cross plies of cords laid parallel to each other in each ply but crosswise with respect to the next ply.

The belt 6 in the embodiments shown is composed of four plies 6A–6D of steel cords: a radially innermost first ply 6A whose cord angle is 50 to 70 degrees, a radially outer second, and third and fourth plies 6B–6D whose cord angles are not more than 30 degrees with respect to the tire equator C.

The tread portion 2 is provided with a convex tread profile having a single radius. It is however possible to use a multi-radius curvature. In FIG. 2, the tire 1 has a so called square shoulder, but in FIG. 9, the tire 1 has a taper shoulder. It is also possible for tire 1 to have a round shoulder.

The tread portion 2 is divided by circumferential grooves 11 and axial grooves 12 into blocks B to form a block pattern. Thus, a circumferentially continuously extending tread element, namely a rib is not provided. Additionally, the blocks B are provided with sipes S extending across the full width thereof from the one side to the other. Each sipe has a configuration which has a generally Z-shape.

The circumferential grooves 11 can be a straight groove, but preferably a zigzag groove is used.

First, an example of a tread pattern which is a combination of a sipe S made up of linear components and a straight circumferential groove is explained. Then, another example which is a combination of a sipe S comprising a curved component and a zigzag circumferential groove is explained. Other combinations are also possible, for example, a sipe S comprising curved components and a straight circumferential groove; and a combination of a sipe made up of linear components and a zigzag circumferential groove.

The sipe S has a width in the range of from 0.3 to 2.0 mm for every kind of tire, such as heavy duty tires and passenger car tires.

In view of the durability of the knife blades which are disposed in the tire vulcanizing mold to form the sipes, the width is preferably more than 0.5 mm.

In order to further improve the blocks rigidity, the sipe width is preferably set in the range of from 0.5 to 1.5 mm, more preferably 0.5 to 1.0 mm.

Figure 1:
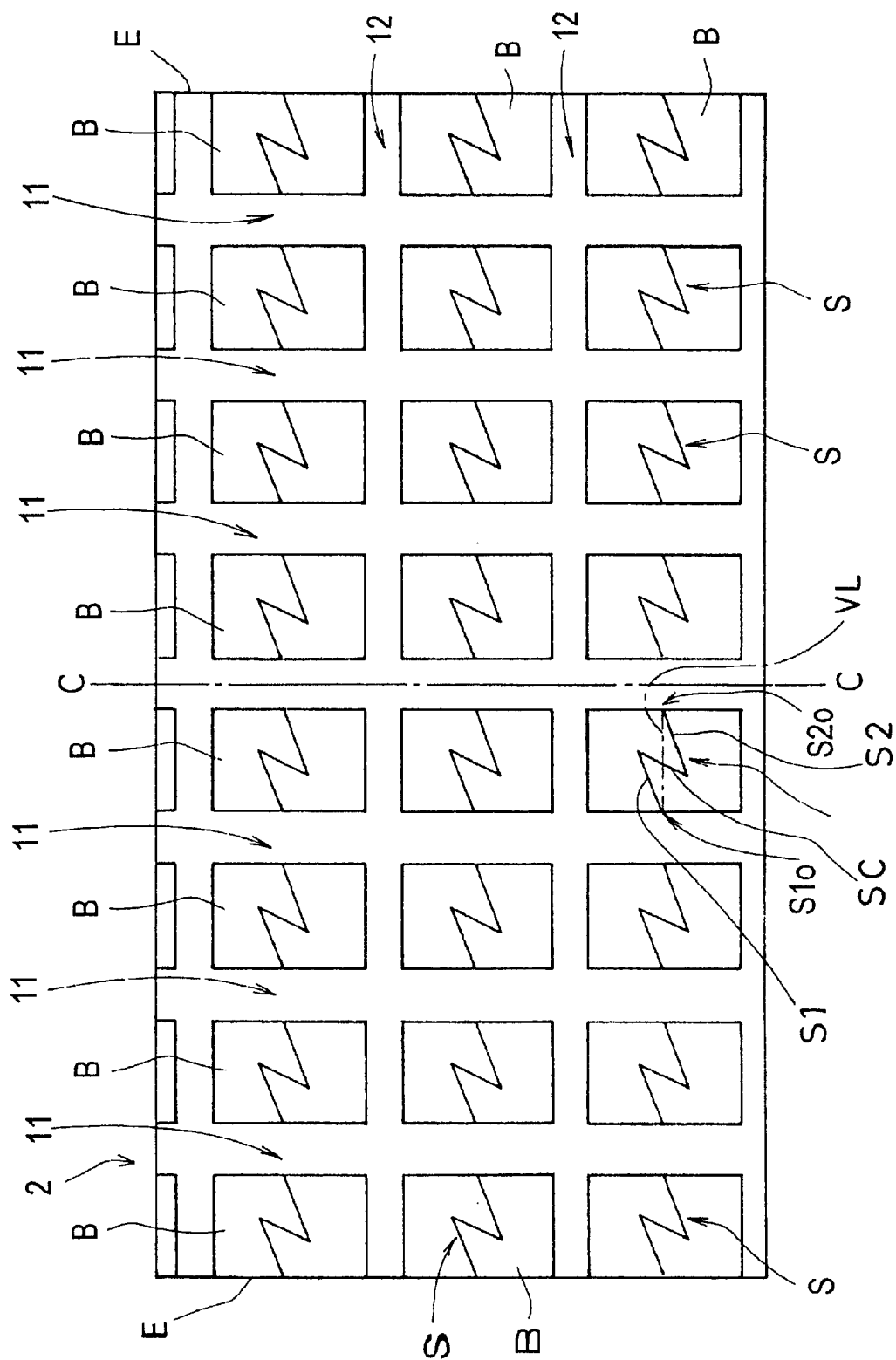
FIG. 1 is a partial plan view of an embodiment of the present invention showing an example of the tread pattern.

In FIG. 1, the tread portion 2 is provided with straight circumferential grooves 11 and axial grooves 12 to form blocks B.

The blocks B are provided with sipes S made up of linear components.

The circumferential grooves 11 in this example are the same width, and the number thereof is seven.

The axial grooves 12 are straight and have the same width. Further, the axial grooves which are aligned from one tread edge E to the other appear to extend across the full width TW of the tread.

Accordingly, all the blocks B have a rectangular configuration which is longer in the tire circumferential direction than the axial direction.

The circumferential grooves 11 and the axial grooves 12 have a width of from 5 to 20 mm, and a depth of from 7 to 20 mm.

The net-to-gross ratio (Land area/Tread area inclusive of Sea area) is in the range of 60 to 67%.

In this example, each of the blocks B is provided with one sipe S. But, it is also possible that some of the blocks are provided with a plurality of sipes.

The sipe S extends across the full width of the block having a pair of ends S1o and S2o which open at both sides of the block facing the circumferential grooves.

Figure 3:
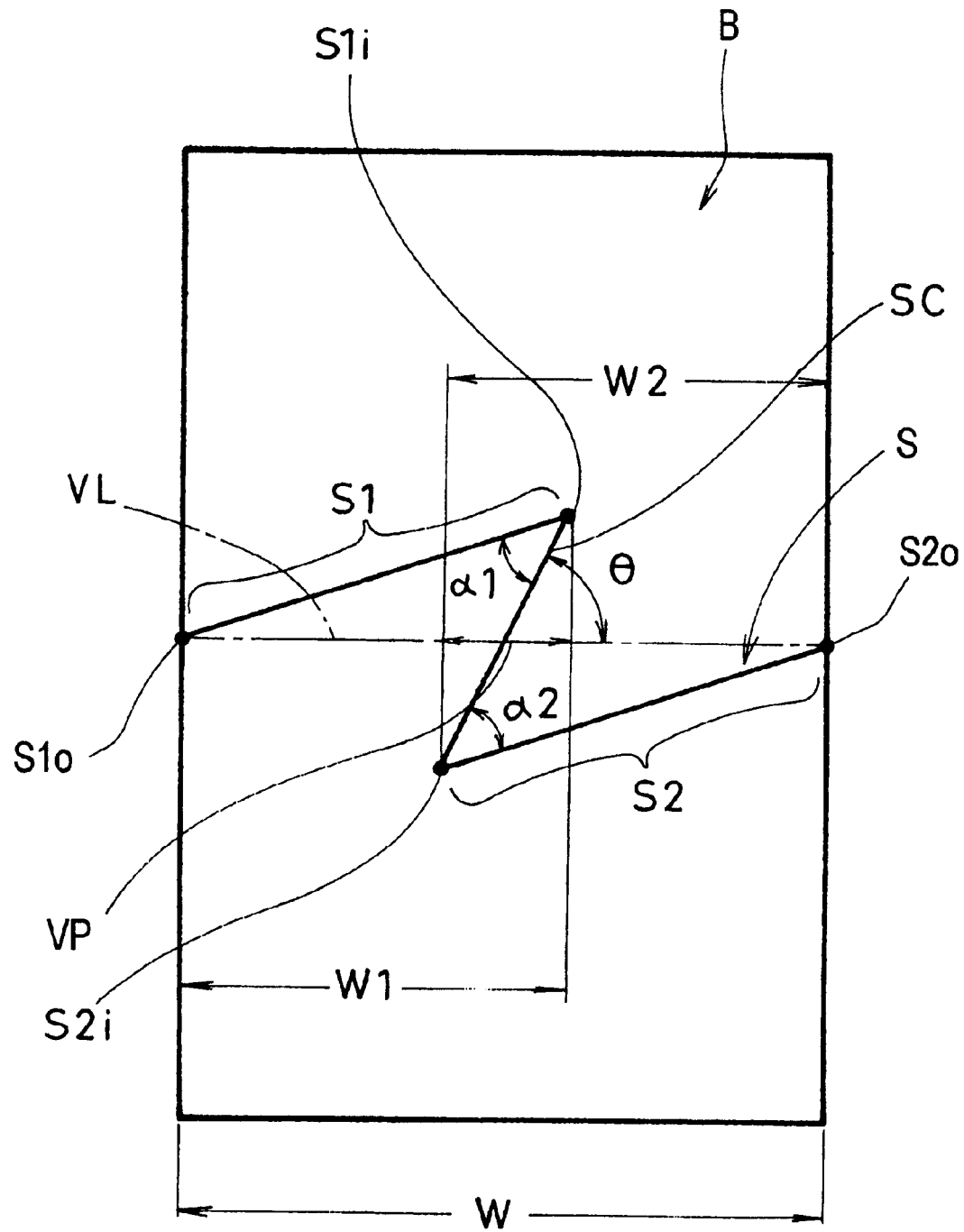
FIG. 3 is a enlarged plan view of a tread block showing an example of the configuration of the sipe.

The sipe S in this example is as shown in FIG. 3, composed of three straight components S1, S2 and SC. The first component S1 extends from the first open end S1o to a first inner end S1i in the block. The second component S2 extends from the second open end S2o to a second inner end S2i in the block. The third central component SC extends between the inner ends S1i and S2i.

The sipe S is disposed such that the inclination angle from a straight line VL drawn from the first open end S1o to the second open end S2o, to lines S1 and S2 is in the range of from 0 to 15 degrees with respect to the axial direction to maximize the edge effect of the sipe at the time of breaking. However, it is also possible to set the inclination angle outside of this range to enhance the edge effect during cornering.

The central component SC is inclined at an angle $\theta$ with respect to the straight line VL. The inclination angle $\theta$ is more than 0 degrees but not more than 83 degrees, preferably 30 to 83 degrees, more preferably 30 to 76 degrees, still more preferably 30 to 63 degrees.

The first and second components S1 and S2 intersect the central component SC at angles $\alpha 1$ and $\alpha 2$, respectively. To prevent the corner's bottom from cracking, the intersecting angles $\alpha 1$ and $\alpha 2$ are not less than 16 degrees, preferably not less than 24 degrees, more preferably 36 to 70 degrees, still more preferably 36 to 56 degrees.

In each sipe, the sum total (W1+W2) of the lengths W1 and W2 of the first and second components S1 and S2 measured in the direction parallel to the straight line VL is more than the length W of the straight line VL, whereby, the sipe has a generally Z-shaped configuration.

The ratio (VP/W1) and ratio (VP/W2) between the length VP of the central component SC measured along the direction parallel to the straight line VL and the lengths W1 and W2 are 0.1 to 0.9, preferably 0.1 to 0.82, more preferably 0.1 to 0.67, still more preferably 0.18 to 0.67.

In this example, the ratio (VP/W1) is equal to the ratio (VP/W2), whereby the effect on preventing the sipe from opening may be maximized.

If the ratio (VP/W1), (VP/W2) is less than 0.1, the sipes are liable to open, and the block rigidity decreases. If the ratio (VP/W1), (VP/W2) is more than 0.9, the corners between the central component SC and the first and second components S1 and S2 are liable to suffer from cracks at the bottom.

The length VP is not less than 0.1 times, preferably not less than 0.15 times, more preferably not less than 0.2 times the length W of the straight line VL. Further, the length VP is not more than 0.6 times, preferably not more than 0.5 times, more preferably not more than 0.3 times the length W.

If the length VP is less than 0.1 times, the opening of the sipe can not be fully controlled, and further, cracks are liable to occur in the bottom.

If the length VP is more than 0.6 times the length W, the rigidity of the block is greatly decreased by the sipe, and the block is liable to be torn off.

The length VN of the central component SC measured along the direction normal to the straight line VL is not less than 0.2 times, preferably not less than 0.3 times, more preferably not less than 0.35 times the length W. Further, the length VN is more than 1.0 times, preferably not more than 0.6 times, more preferably not more than 0.5 times the length W.

If the length VN is less than 0.2 times the length W, the opening of the sipe can not be fully controlled, and further, cracks are liable to occur in the bottom. If the length VN is more than 1.0 times the length W, the rigidity of the block is greatly decreased by the sipe, and the block is liable to be torn off, and on-the-ice performance decreases.

As the first and second components S1 and S2 intersect the central component SC with the acute angles $\alpha 1$ and $\alpha 2$, the resultant edged corners therebetween are liable to crack at the bottom.

Figure 4:
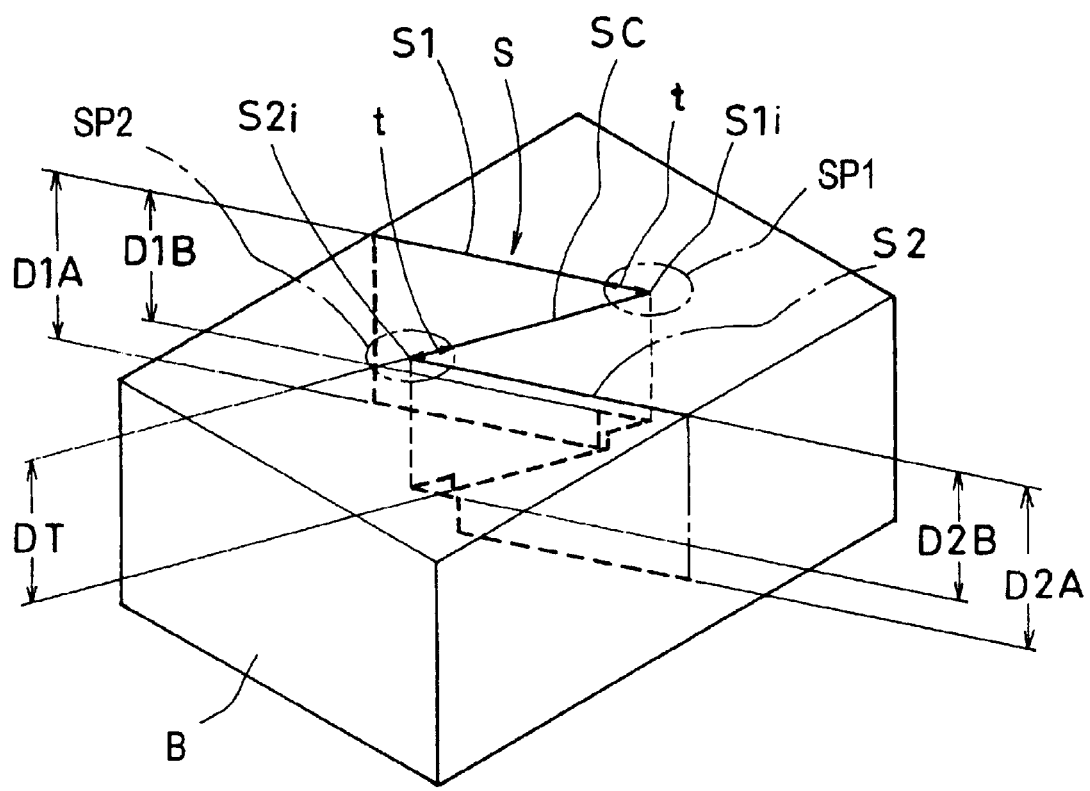
FIG. 4 is a schematic perspective view thereof.

Therefore, as shown in FIG. 4, the corners are shallowed in order to prevent such cracks. The range (t) of the shallowed part SP1, SP2 is 0.1 times the length W of the straight line VL from the edge S1i, S2i.

The average depth D1B of the first corner SP1 is less than the average depth D1A of the first component S1 excepting this corner.

Similarly, the average depth D2B of the second corner Sp2 is less than the average depth D2A of the second component S2 excepting this corner. The ratio (D1B/D1A) and ratio (D2B/D2A) are 0.6 to 0.9, preferably 0.6 to 0.8. The ratio (D1B/D1A) equals to the ratio (D2B/D2A).

Further, the blocks B in the ground contacting patch are subjected to a twisting force during cornering, and the bottom of the sipe is liable to crack in the central component SC than the first and second components S1 and S2.

Therefore, the average depth DT of the central component SC excepting the first and second corners is less than the average depth D1A, D2A. The ratio (DT/D1A) and ratio (DT/D2A) is 0.6 to 0.9, preferably 0.6 to 0.8.

The average depths D1A and D2A of the first and second components S1 and S2 are 40 to 100%, preferably 40 to 70% of the depth of the circumferential grooves 11.

Additionally, it is possible to round the corner as explained in the next embodiment in order to further decrease the occurrence of cracks.

FIG. 5 shows other examples (A) and (B) of the sipe S, wherein the central component SC is straight, but the first and second parts S1 and S2 are a zigzag configuration of connected straight lines to increase the length of the sipe S and thus to further improve the on-the-ice performance.

The intersecting angles α1 and α2 are set in the same way as explained above.

Preferably, the angle β1 between the central component SC and a straight VL1 drawn between the open end S1o and other inner end S1i of the first component S1 and the angle β2 between the central component SC and a straight line VL2 drawn between the open end S2o and other inner end S2i of the second component S2 are smaller than α1 and α2, and the difference therebetween is not less than 10 degrees. That is, $$\alpha1-\beta1 \geq 10 \text{ degrees}$$

and $$\alpha2-\beta2 \geq 10 \text{ degrees}.$$

As a result, the occurrence of the cracks in the corners can be further controlled.

[Comparison Test 1]

Test tires for trucks and buses having the same structure shown in FIGS. 1 and 2 except for the sipe configuration were made, and the following tests were conducted using a 2–2D truck (carrying capacity 10 tons) all the wheels of which are provided with test tires.

A) On-the-Ice Braking Performance Test

The braking distance of the vehicle when running on a slick iced road at a speed of 30 km/h and a wheel-lock brake was applied was measured.

B) On-the-Ice Cornering Performance Test

On a slick iced road, the cornering performance was evaluated by the test driver's feeling.

C) Steering Stability Test

During running on a dry paved road, the steering stability was evaluated by the test driver's feeling.

The results of the tests A–C) are shown in Table 1, using an index based on that the reference tire A1 is 100, and the larger the value, the better the performance.

D) Durability Test 1

After running 10000 km including 5000 km on dry paved roads, 2500 km on wet paved roads and 2500 km on dirt roads, one tire whose tread appeared to be most damaged was picked out in all the tires of the vehicle and checked up in detail. The results are shown in Table 2.

| Common Test Data: | |
| --- | --- |
| Tire size: | 11R22.5 |
| Tread width TW: | 230 mm |
| Carcass: | single ply of 3 + 7 steel cords |
| | cord angle = 90 degrees |
| Blocks | |
| Circumferential length: | 30 mm |
| Axial width: | 20 mm |
| Belt: | four plies of 3 + 6 steel cords |
| cord angles to the tire equator and inclining direction: | |
| | 50 deg. right, |
| | 18 deg. right, |
| | 18 deg. left, |
| | 18 deg. left |
| | (from the radially inside to outside) |
| Rim size: | 7.50 × 22.5 (Standard rim) |
| Inner pressure: | 8.0 kgf/sq. cm |

TABLE 1

| Tire | Ref. A1 | Ref. A2 | Ex. A1 | Ex. A2 | Ex. A3 | Ex. A4 | Ex. A5 | Ex. A6 | Ex. A7 | Ex. A8 | Ex. A9 | Ex. A10 |
| --- | --- | --- | --- | --- | --- | --- | --- | --- | --- | --- | --- | --- |
| Sipe | FIG. 7 | FIG. 6 | FIG. 3 | FIG. 3 | FIG. 3 | FIG. 3 | FIG. 3 | FIG. 3 | FIG. 3 | FIG. 3 | FIG. 5(A) | FIG: 5(B) |
| W1 (mm) | — | 10 | 10.5 | 11 | 12 | 13 | 15 | 17 | 12 | 12 | 12 | 12 |
| W2 (mm) | — | 10 | 10.5 | 11 | 12 | 13 | 15 | 17 | 12 | 12 | 12 | 12 |
| VP (mm) | — | 0 | 1 | 2 | 4 | 6 | 10 | 14 | 4 | 4 | 4 | 4 |
| VP/W1 | — | 0 | 0.95 | 0.18 | 0.33 | 0.46 | 0.67 | 0.82 | 0.33 | 0.33 | 0.33 | 0.33 |
| VP/W2 | — | 0 | 0.95 | 0.18 | 0.33 | 0.46 | 0.67 | 0.82 | 0.33 | 0.33 | 0.33 | 0.33 |
| W | — | 20 | 20 | 20 | 20 | 20 | 20 | 20 | 20 | 20 | 20 | 20 |
| θ (deg) | — | 90 | 83 | 76 | 63 | 53 | 39 | 30 | 63 | 63 | 63 | 63 |
| α1 (deg) | — | 68 | 62 | 56 | 45 | 36 | 24 | 16 | 45 | 45 | 63 | 55 |
| α2 (deg) | — | 68 | 62 | 56 | 45 | 36 | 24 | 16 | 45 | 45 | 63 | 55 |
| β1 (deg) | — | 68 | 62 | 56 | 45 | 36 | 24 | 16 | 45 | 45 | 45 | 45 |
| β2 (deg) | — | 68 | 62 | 56 | 45 | 36 | 24 | 16 | 45 | 45 | 45 | 45 |
| α1-β1 | | 0 | 0 | 0 | 0 | 0 | 0 | 0 | 0 | 0 | 18 | 10 |
| α2-β2 | | 0 | 0 | 0 | 0 | 0 | 0 | 0 | 0 | 0 | 18 | 10 |
| D1A=D2A (mm) | 12 | 12 | 12 | 12 | 12 | 12 | 12 | 12 | 12 | 12 | 12 | 12 |
| D1B=D2B (mm) | 12 | 12 | 12 | 12 | 12 | 12 | 12 | 12 | 8.5 | 8.5 | 12 | 12 |
| DT (mm) | 12 | 12 | 12 | 12 | 12 | 12 | 12 | 12 | 12 | 8.5 | 12 | 12 |
| D1B/D1A | — | 1 | 1 | 1 | 1 | 1 | 1 | 1 | 0.7 | 0.7 | 1 | 1 |
| DT/D1A | — | 1 | 1 | 1 | 1 | 1 | 1 | 1 | 1 | 0.7 | 1 | 1 |
| Braking | 100 | 120 | 120 | 130 | 130 | 130 | 130 | 130 | 130 | 130 | 130 | 130 |

TABLE 1-continued

| Tire | Ref. A1 | Ref. A2 | Ex. A1 | Ex. A2 | Ex. A3 | Ex. A4 | Ex. A5 | Ex. A6 | Ex. A7 | Ex. A8 | Ex. A9 | Ex. A10 |
|---|---|---|---|---|---|---|---|---|---|---|---|---|
| Cornering | 100 | 100 | 103 | 105 | 106 | 110 | 112 | 113 | 107 | 106 | 108 | 108 |
| Steering stability | 100 | 110 | 120 | 120 | 120 | 120 | 120 | 120 | 120 | 120 | 120 | 120 |

TABLE 2

| Tire | Durability |
|---|---|
| Ref. A1 | The rubber of one of the divided block parts was torn off. |
| Ref. A2 | The rubber of one of the divided block parts was torn off. |
| Ex. A1 | The bottom of the first component S1 was cracked. Max. depth = 7 mm |
| Ex. A2 | The bottom of the first component S1 was cracked. Max. depth = 1 mm |
| Ex. A3 | The bottom of the first corner SP1 was cracked. Max. depth = 1 mm |
| Ex. A4 | The bottom of the first corner SP1 was cracked. Max. depth = 6 mm |
| Ex. A5 | The bottom of the first corner SP1 was cracked. Max. depth = 10 mm |
| Ex. A6 | The rubber near the first corner SP1 was torn off. |
| Ex. A7 | No damage |
| Ex. A8 | The bottom of the first corner SP1 was wrinkled. |
| Ex. A9 | No damage |
| Ex. A10 | No damage |

It was confirmed from the test results that the tires according to the present invention were improved in the on-the-ice performances and steering stability in comparison with the reference tires.

FIG. 8 show various modifications (A)–(E) of the configuration of the sipe, each of which comprises a curved component. In each modification, the central component SC is straight. In (A), (C), (D) and (E), each of the first and second components S1 and S2 is composed of a straight line extending from the open end S1o, S2o and a curved line. In (B), (C), (D) and (E), the circumferential positions of the open ends S1o and S2o are shifted each other in the tire circumferential direction.

Figure 10:
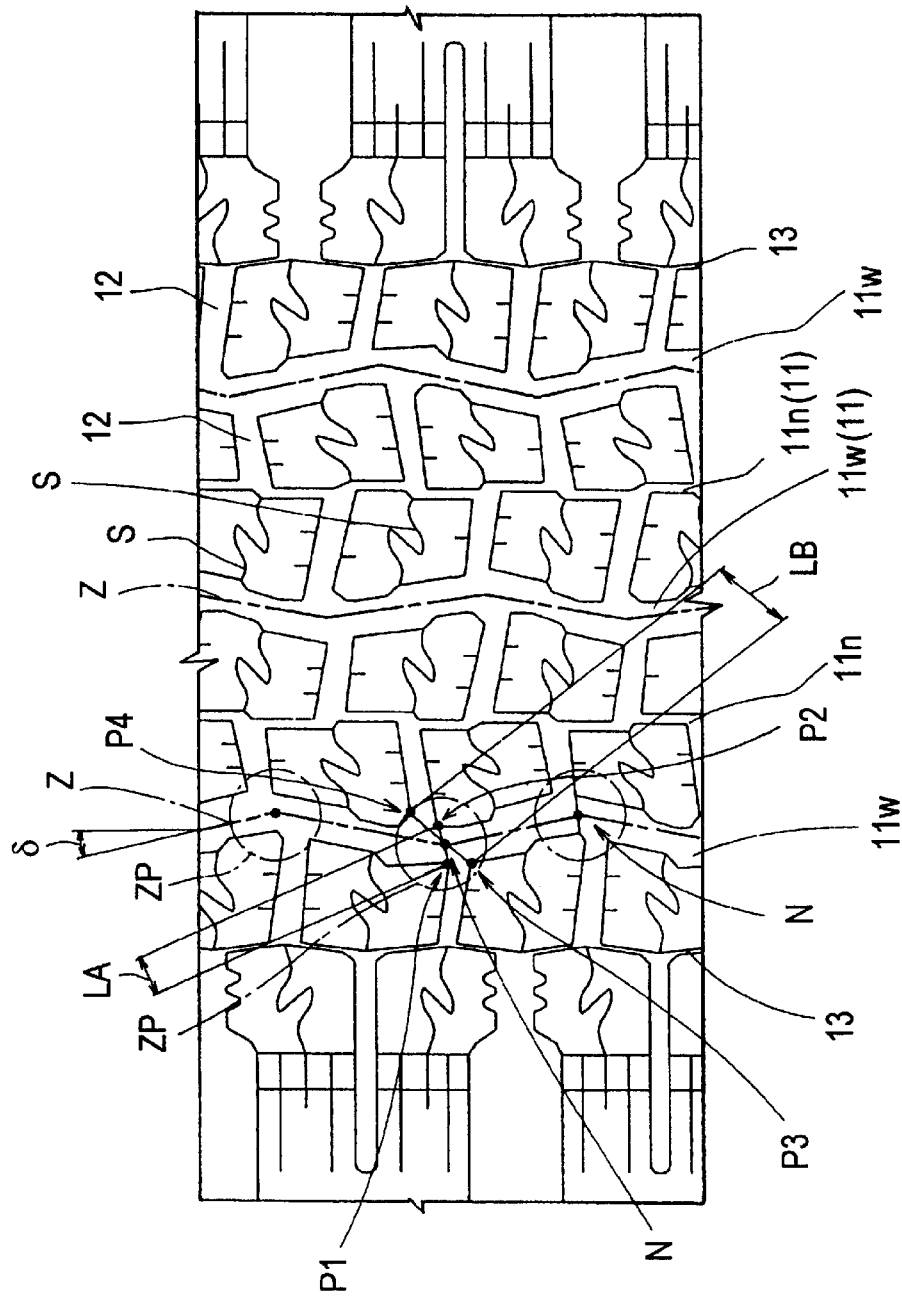
FIG. 10 is a partial plan view thereof showing another example of the tread pattern.

Next, FIGS. 9 and 10 show another embodiment of the present invention, wherein sipes S by the above-mentioned modification (B) are employed.

This embodiment is also a heavy duty tire for trucks and buses.

The tread portion 2 is provided with zigzag circumferential grooves 11 and inclined axial grooves 12 to form blocks B. These tread grooves will be explained later.

In this example, each of the blocks B is provided with one sipe S. But, it is also possible that some of the blocks are provided with a plurality of sipes.

Figure 11:
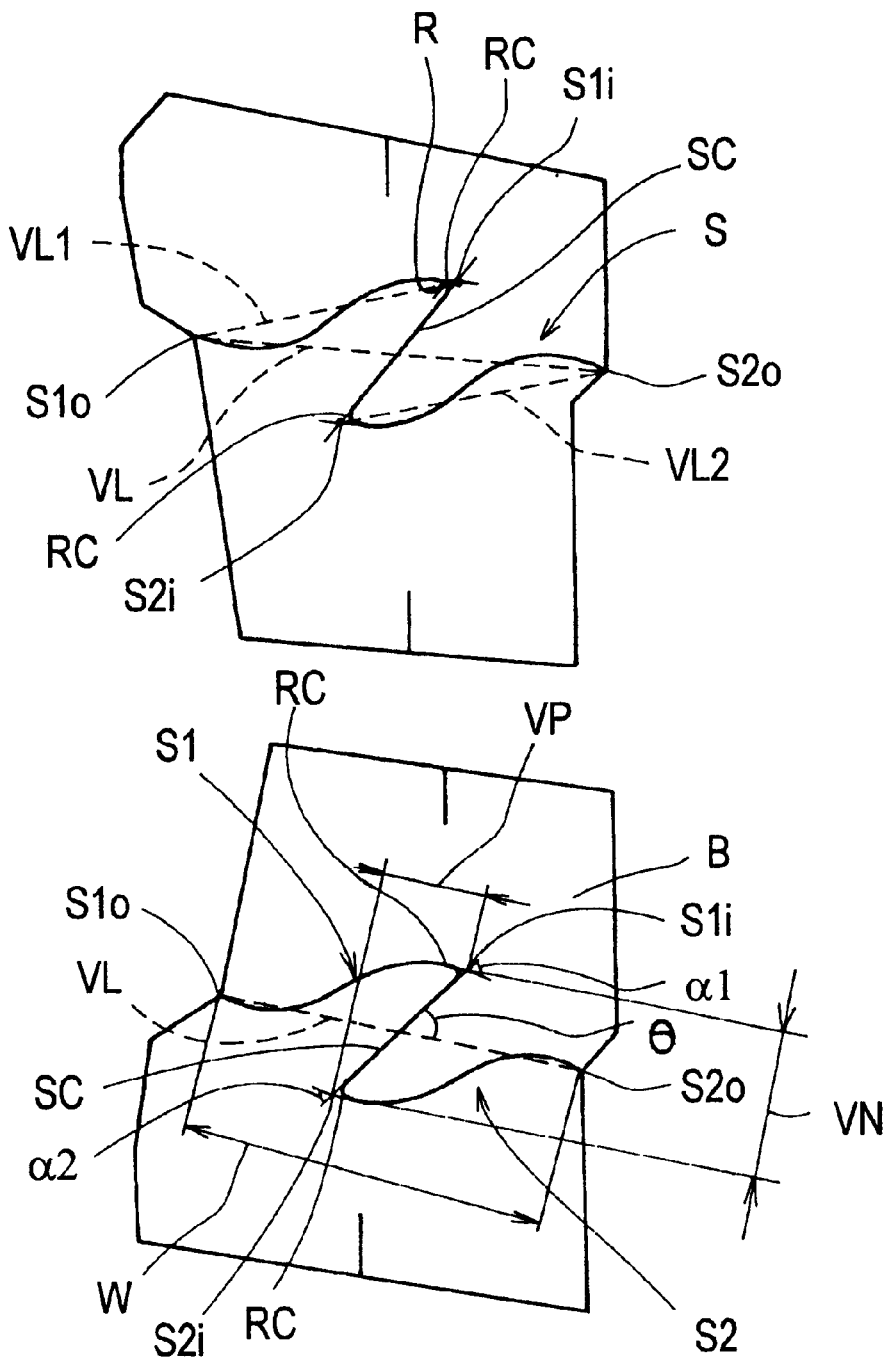
FIG. 11 is an enlarged plan view of blocks thereof showing the sipe configuration.

As shown in FIG. 11, the central component SC is straight, but both the first component S1 and the second component S2 are curved like one cycle of a sine wave. The first component S1 and the second component S2 swell from the central component SC on the corner side rather than the open end side.

The configuration of the sipe S is a point-symmetric around the intersecting point between the central component SC and the straight line VL.

Further, the corners RC between the central component SC and the first and second components S1 and S2 are rounded by a small radius R. The radius R is in the range of from 0.5 to 1.0 mm. Preferably, the lower limit is 0.7 mm, and the upper limit is 0.9 mm. Accordingly, the occurrence of cracks in these portions can be decreased.

If the radius R is less than 0.5 mm, it is difficult to prevent the occurrence of cracks. If the radius R is more than 1.0 mm, the sipe 11 has a tendency to open.

Also it is possible to shallow the corner as explained in the former embodiment to further decrease the occurrence of cracks.

In this example, the straight line VL of each sipe S is substantially parallel to the tire axial direction, that is, the angle to the axial direction is less than 5 degrees. It is however possible to set the angle out of this range.

Apart from the foregoing, the numerical limitations explained in the former embodiment can be applied to the sipes S in this embodiment.

When the corners are rounded, as the radius is very small, it will be easy to substantially determine the above-mentioned various dimensions concerning the sipe. However, if it is necessary to strictly define the dimensions, the inner ends S1i and S2i can be defined as the intersections of extended lines of the components S1, S2 and SC.

[Comparison Test 2]

Test tires for trucks and buses having the same structure shown in FIGS. 10 and 11 except for the ratios (VP/W) and (VN/W) were made, and the following tests were conducted using a 2–2D truck in the same way as the above-mentioned Comparison Test 1.

E) Durability Test 2

After running 20000 km including 10000 km on dry paved roads, 5000 km on wet paved roads and 5000 km on dirt roads, cracked blocks were counted, which is shown in Table 3 as a percentage to the number of all the blocks.

F) On-the-Ice Braking Performance Test

Same as test A)

TABLE 3

| Tire | Ex. B1 | Ex. B2 | Ex. B3 | Ex. B4 | Ex. B5 | Ex. B6 | Ex. B7 | Ex. B8 | Ref. B1 | Ref. B2 | Ref. B3 |
|---|---|---|---|---|---|---|---|---|---|---|---|
| W1/W | 0.24 | 0.3 | 0.3 | 0.8 | 0.8 | 0.1 | 0.3 | 0.3 | 0 | 0 | 0 |
| W2/W | 0.40 | 0.6 | 1.2 | 0.6 | 1.2 | 0.6 | 0.2 | 0.1 | 0 | 0.5 | 1.2 |
| Durability (%) | 0 | 3 | 11 | 12 | 21 | 15 | 16 | 17 | 20 | 18 | 35 |
| Braking | 108 | 107 | 105 | 102 | 97 | 101 | 103 | 102 | 100 | 101 | 98 |

TABLE 3-continued

Common Test Data:
Same as Comparison Test 1 excepting the blocks.

Block:

| | |
|---|---|
| Maximum circumferential length: | 30 mm |
| Maximum axial width: | 20 mm |

The circumferential grooves 11 include wide grooves 11w having a width of 4.0 to 20.0 mm, and narrow grooves 11n having a width of not less than 2.0 mm but less than 4.0 mm.

Preferably, at least three wide grooves 11w are disposed in a tread crown region Tc for the drainage and on-the-snow performances. The tread crown region means a central region having 60% width of the tread.

If all the circumferential grooves 11 are the wide grooves 11w only, the wear resistance as well as on-the-ice performance and dry running performance decreases. If all the circumferential grooves 11 are the narrow grooves 11n only, it is difficult to obtain the necessary on-the-snow performances and drainage. It is therefore, preferable that three or more wide grooves 11w and two or more narrow grooves 11n are alternately disposed.

In this embodiment, one wide groove 11w is disposed on the tire equator C, and two wide grooves 11w are disposed one on each side of the tire equator C, and one narrow groove 11n is disposed in each space between the wide grooves 11w. Further, one circumferential slit 13 having a width of less than 2.0 mm is disposed in each space between the wide grooves 11w and the tread edges E. However, instead of the circumferential slits 13, narrow grooves 11n may be disposed as one of modifications.

Here, the width of the grooves 11, 12 and slits 13 is defined as the minimum distance measured between the groove walls at the tread face when the tire is normally inflated.

The circumferential narrow grooves 11n and slits 13 have a substantially constant width.

Figure 12:
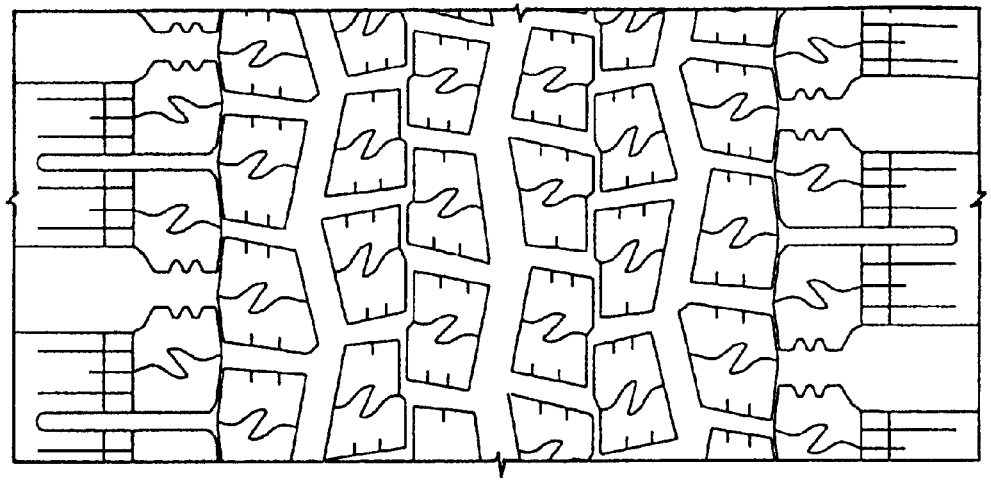
FIG. 12 is a partial plan view showing another example of the tread pattern.

The circumferential wide grooves 11w have a variable width in the example shown in FIG. 10. However, the wide grooves 11w can be a substantially constant width as shown in FIG. 12.

Further, the narrow grooves 11n and circumferential slits 13 may be a variable width.

The depths of the circumferential grooves 11 and slits 13 and the axial grooves 12 are usually 7 to 20 mm. In this example, the wide grooves 11w is deepest in the circumferential grooves 11, the circumferential slits 13 and the axial grooves 12.

The depths of the narrow grooves 11n and the circumferential slits 13 are in the range of 10 to 13 mm.

In contrast with the FIG. 1 example, the circumferential wide grooves 11w are zigzag, and also the narrow grooves 11n and circumferential slits 13 are zigzag. The zigzag line preferably extends at an angle δ of from 9 to 15 degrees to the tire circumferential direction.

At least one side of each block facing one of the circumferential wide grooves 11w extends zigzag to form relatively long portions and a short portion therebetween. The short portion is positioned almost centrally of the block with regard to the tire circumferential direction. The long portions are inclined substantially parallel to the zigzag line, and therefore, the inclination angle γ is about 9 to 15 degrees to the tire circumferential direction. The short portion is inclined at a greater angle γmax than the long portions with respect to the tire circumferential direction. Therefore, the road grip and traction can be further improved.

The first and second open ends S1o and S2o of the sipes S can be disposed at the corners of the sides.

When the sides of the blocks are zigzagged, the groove width is liable to excessively decrease partially. Therefore, to avoid this, the circumferential positions of the blocks are shifted on both sides of the circumferential groove 11.

The circumferential wide groove 11w is provided between the points XP of the zigzag with a wide part having a maximum width XM2 and a narrow part having a minimum width Xm1, wherein Xm1/XM2=0.5 to 0.8, Xm1≧4.0 mm, and XM2≦20.0 mm.

The zigzag angle less than 9 degrees and the ratio Xm1/XM2 more than 0.8 can not improve on-the-ice performance. The zigzag angle more than 15 degrees and the ratio Xm1/XM2 less than 0.5 decrease the drainage and liable to cause the so called stone trapping, rubber tear and uneven wear.

In order to reduce the uneven wear of the blocks B caused by the alternate arrangement of the wide grooves 11w and narrow grooves 11n, the axial grooves 12 therebetween are preferably increased in the width from the wide groove to the narrow groove at a substantially constant rate.

The axial grooves 12 extend substantially straight and the angle of the centre line thereof to the tire axial direction is set in the range of not more than 30 degrees, preferably not more than 20 degrees, more preferably not more than 15 degrees for the road grip performance. Aside from a straight configuration, the axial grooves may have a zigzag or wavy configuration.

The net-to-gross ratio in this tread is set in the range of 50 to 75%.

In this tread pattern, axial grooves inclusive of the sipes do not align axially of the tire in contrast to the tread pattern shown in FIG. 1.

Figure 6:
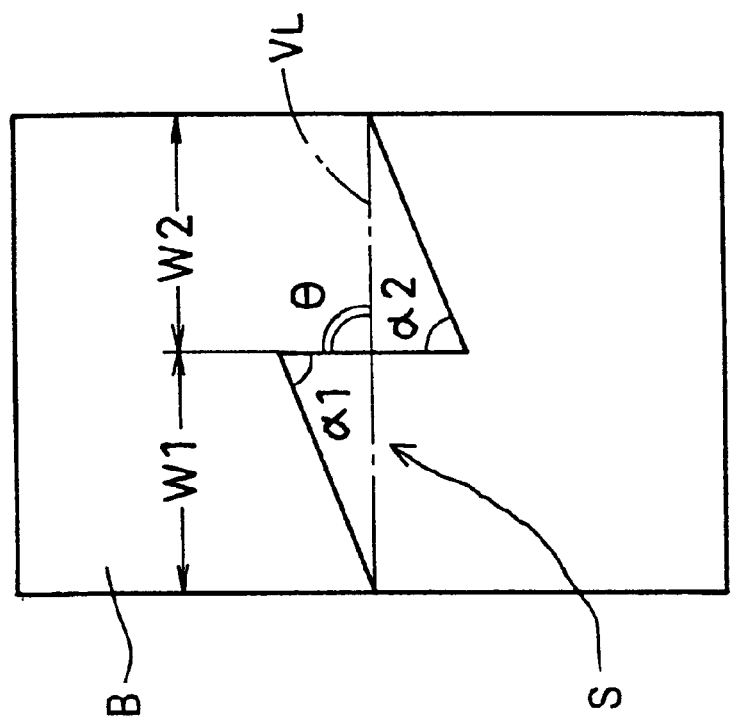
FIG. 6 shows a sipe configuration used in comparison tests.
Figure 7:
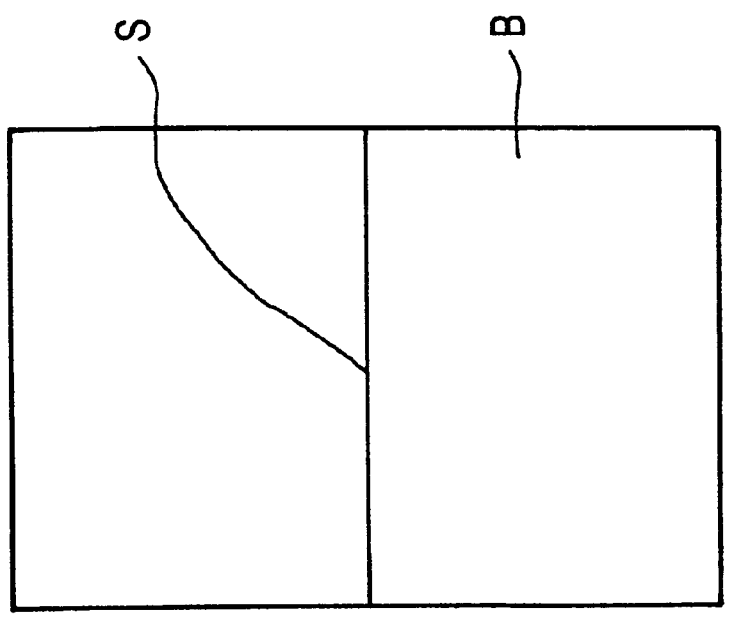
FIG. 7 shows the conventional straight configuration.

If all the conditions are the same except for the groove arrangement (namely, aligned as shown in FIG. 6 or not aligned as shown in FIG. 7), the braking performance and cracks in example tires having axial grooves not aligned are a few points better than tires having aligned axial grooves.

When the width of a zigzag circumferential groove is changed and further axial grooves are connected thereto near the zigzag points ZP as in the example shown in FIG. 10, the zigzag centre line Z of the circumferential groove can be defined as follows and the above-mentioned zigzag angle δ is defined as of this zigzag centre line.

1) find a minimum distance LA from the distances LA, LB
   - - - between opposite corners (P1 and P2), (P3 and P4)
   - - - of four blocks B surrounding a zigzag point ZP, 2) find the centre point N of the minimum distance LA, 3) repeat 1) and 2) along the circumferential groove, and 4) connect the centre points N with straight lines. The resultant zigzag line is the zigzag centre line Z of the circumferential groove.

[Comparison Test 3]

Test tires for trucks and buses having the same structure shown in FIG. 9 except for tread patterns were made, and the following tests were conducted using a 2–2D truck.

G) On-the-Ice Braking Performance Test
 Same as above A)

H) On-the-Ice Starting and Acceleration Test
 On the iced road, the traction at the time of starting and accelerating the vehicle was evaluated by the driver's feeling.

The results are indicated in Table 4 by an index based on that Ref. tire C1 is 100, and the larger the value, the better the traction performance.

TABLE 4

Figure 15:
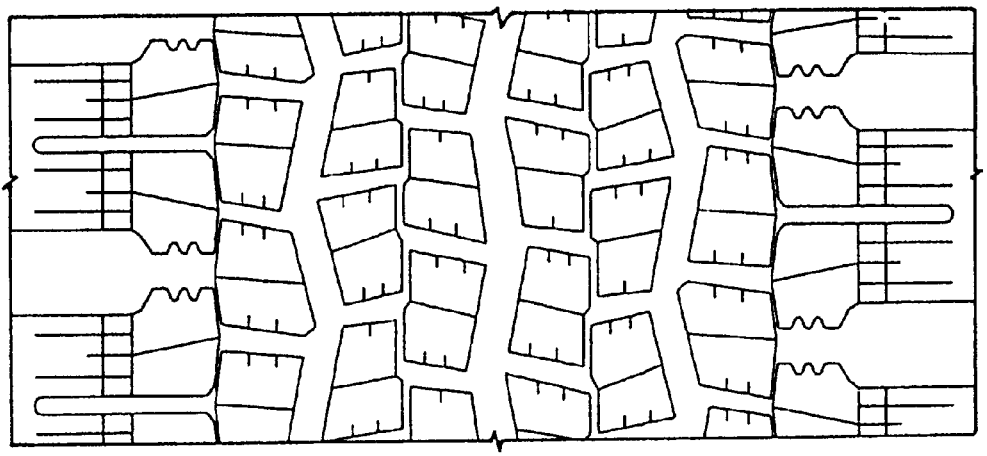
Figure 13:
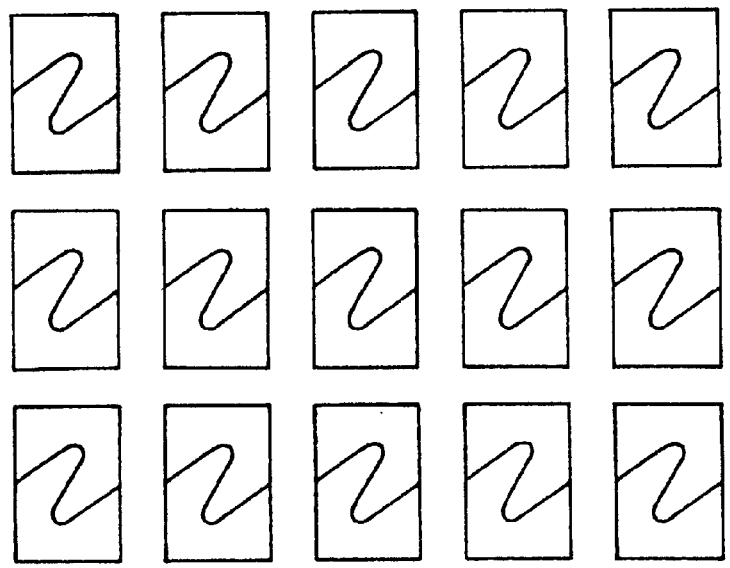
FIGS. 13 and 14 are schematic plan views for explaining the arrangements of the sipes and axial grooves.
Figure 14:
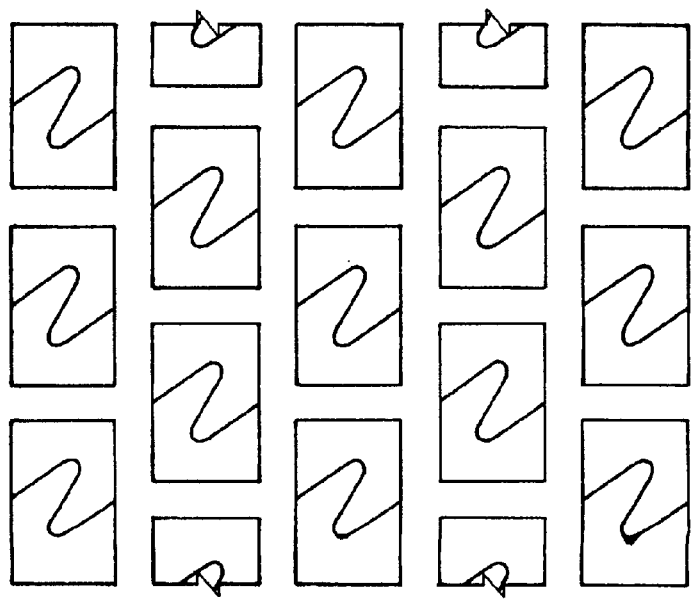
Figure 16:
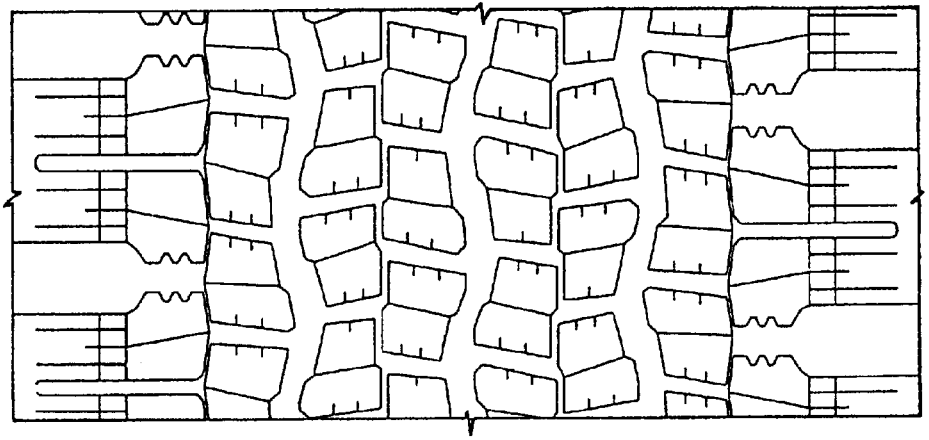
Figure 17:
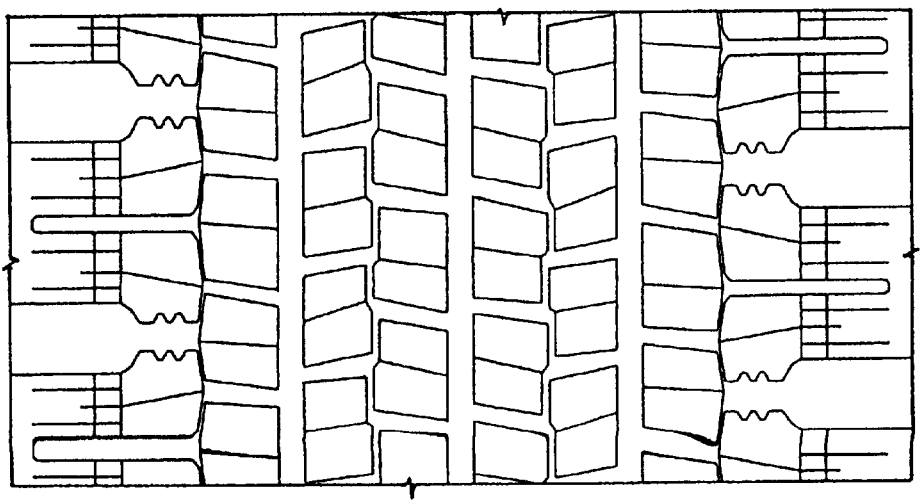

| Tire | Ex. C1 | Ref. C1 | Ref. C2 | Ex. C2 | Ref. C3 | Ref. C4 |
|---|---|---|---|---|---|---|
| Tread pattern | FIG. 10,11 | FIG. 15 | FIG. 16 | FIG. 12 | FIG. 17 | FIG. 18 |
| Sipe | Z | straight | straight | Z | straight | straight |
| (W1 + W2)/W | 1.16–1.3 | 1 | 1 | 1.16–1.3 | 1 | 1 |
| Wide groove 11 w | | | | | | |
| Zigzag angle δ (deg) | 10–15 | 9–15 | 10–15 | 9–15 | 0 | 16–18 |
| Width ratio Xm1/XM2 | 0.55–0.77 | 1.0 | 0.55–0.77 | 1.0 | 1.0 | 1.0 |
| Angle γ | | | | | | |
| γmin. (deg) | 6 | — | 6 | — | — | — |
| γmax. (deg) | 68 | — | 68 | — | — | — |
| Narrow groove 11 n | | | | | | |
| Width (mm) | 2.5 | 2.5 | 2.5 | 2.5 | 2.5 | 2.5 |
| Slit 13 | | | | | | |
| Width (mm) | 1.0 | 1.0 | 1.0 | 1.0 | 1.0 | 1.0 |
| Test results | | | | | | |
| Braking | 105 | 100 | 103 | 103 | 96 | 98 |
| Starting | 106 | 100 | 102 | 102 | 96 | 99 |

Common Test Data:
Same as Comparison Test 1

As described above, according to the present invention, the pneumatic tire has the blocks provided with generally Z-shapes sipes.

Accordingly, the total length of the edges of the blocks are increased to improve the on-the-ice performance. As the block is divided by the Z-shaped sipe, the divided parts are engaged with each other to control the opening thereof, and the rubber is prevented from tearing off. Further, the block rigidity and ground contacting area are increased to improve the steering stability, on-the-ice performances and uneven wear such as heel/toe wear.

Incidentally, it is also possible to form a sipe such that one of the first and second components S1 and S2 is straight but the other is curved. Further, two or more sipes can be disposed in one block depending on the block size. Furthermore, the configurations of the sipes can be revered with respect to the tire equator C, for example the sipes on the right side have configurations like "Z", but on the left side like "S".

The present invention is suitably applied to heavy duty pneumatic tires, but it can be applied to other types of tires such as passenger car tires.

The entire disclosure of Japanese Patent Applications No. 8-206101, 9-153821 and 9-182666 including specification, claims drawings and summary incorporated herein by reference in its entirety.

We claim:

1. A pneumatic tire comprising a tread portion,
 the tread portion provided with grooves to form blocks,
 each block provided with a sipe,
 the sipe extending across the block to have a first open end and second open end,
 the sipe comprising
  a first component extending from the first open end,
  a second component extending from the second open end and
  a central component extending therebetween so as to form a configuration such that the motion when the sipe is traced from the first open end to the second open end is first towards the second open end in the first component, then towards the first open end in the central component and again towards the second open end in the second component, whereby
 the configuration is generally a Z-shape or a mirror image of Z-shape,
 said central component having a substantially straight configuration,
 the first and second components each having either a zigzag configuration or a wavy configuration,
 an angle β1 between the central component and a straight line drawn between the first open end and a first inner end of the first component being an acute angle, and
 an angle β2 between the central component and a straight line drawn between the second open end and a second inner end of the second component being an acute angle,
 the first and second components intersecting the central component so as to define acute angles α1 and α2, respectively,
 said angle β1 being not larger than the angle α1 minus 10 degrees.

2. The pneumatic tire according to claim 1, wherein a length VP of the central component, a length W1 of the first component and a length W2 of the second component, each measured along a direction parallel to a straight line drawn from the first open end to the second open end, satisfy $$0.1 \leq VP/W1 \leq 0.67$$

and $$0.1 \leq VP/W2 \leq 0.67.$$

3. The pneumatic tire according to claim 1, wherein the inclination of a straight line drawn from the first open end to the second open end is in the range of 0 to 15 degrees with respect to the axial direction of the tire, and the inclination of the central component is more than 0 degree but not more than 83 degrees with respect to the straight line.

4. The pneumatic tire according to claim 1, wherein the sipe is provided with a shallow corner between each of the first and second components and the central component, and the central component is shallower than the first and second components excepting the shallow corners, and further the shallow corners are shallower than the central component.

5. The pneumatic tire according to claim 1, wherein the central component intersects each of the first and second components with the acute angle α1, α2 to form a first respectively edged corner and a second edged corner, respectively, and each angle α1, α2 respectively is not less than 16 degrees.

6. The pneumatic tire of claim 5, wherein each first and second component consists of three substantially straight segments which are connected so as to define the zigzag configuration.

7. The pneumatic tire according to claim 1, wherein a rounded corner is provided between the first and the central components and also between the central component and the second component and each rounded corner has a radius R in the range of 0.5 to 1.0 mm, wherein the width of the sipes at the corners is substantially the same as the width of the first, second and central components.

8. The pneumatic tire according to claim 1, wherein the length of the central component measured along the direction parallel to a straight line drawn from the first open end to the second open end is 0.1 to 0.6 times the length of the straight line, and the length of the central component measured along the direction normal to the straight line is 0.2 to 1.0 times the length of the straight line.

9. The pneumatic tire according to claim 1, wherein the tread grooves include circumferential wide grooves each extending continuously in the tire circumferential direction along a zigzag line, said zigzag line composed of straight segments each inclined at an angle of from 9 to 15 degrees with respect to the tire circumferential direction.

10. The pneumatic tire according to claim 9, wherein a sidewall of each of the blocks constituting part of one of the groove walls of one of the circumferential wide grooves varies its inclination angle within the range of from 5 to 70 degrees with respect to the tire circumferential direction, and a middle part of the block wall defines a maximum inclination angle.

11. The pneumatic tire of claim 1, wherein the first and second components are wavy so as to be configured as a one cycle sine wave which crosses a respective straight line.

12. The pneumatic tire of claim 1, wherein said first component crosses the straight line drawn between the first open end and the first inner end of the first component only one time, and the second component crosses the straight line drawn between the second open end and the second inner end of the second component only one time.

* * * * *